United States Patent Office 3,398,573
Patented Aug. 27, 1968

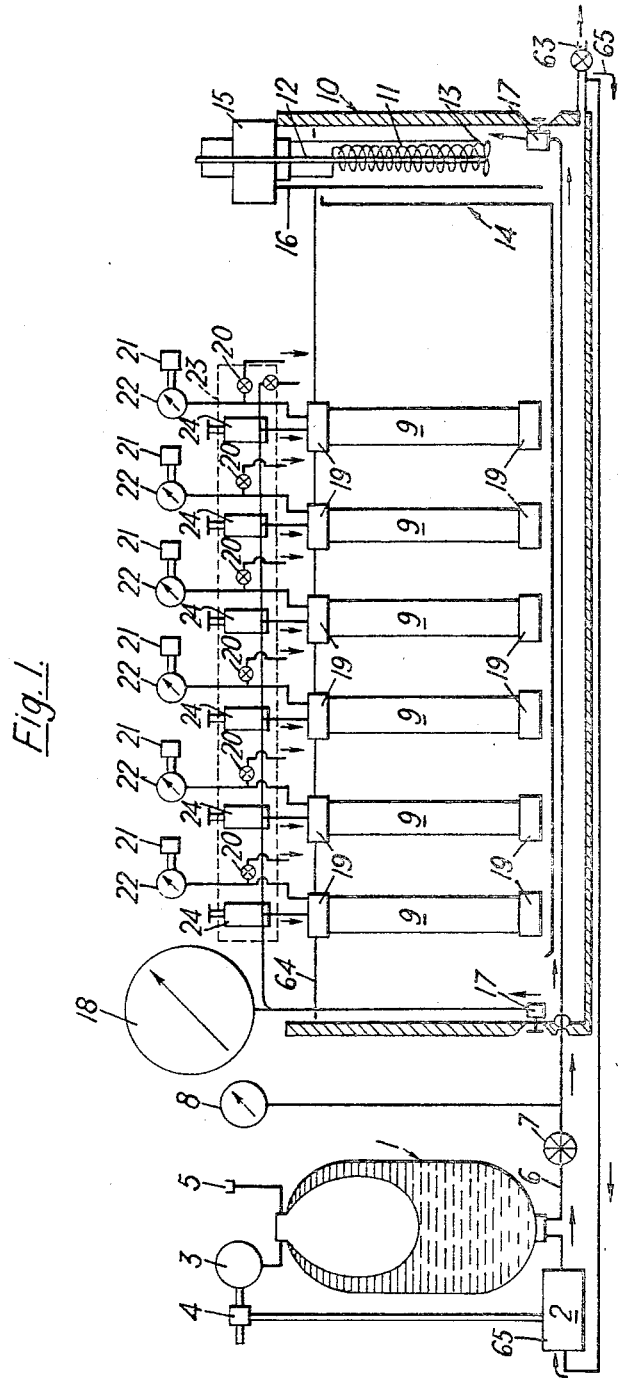

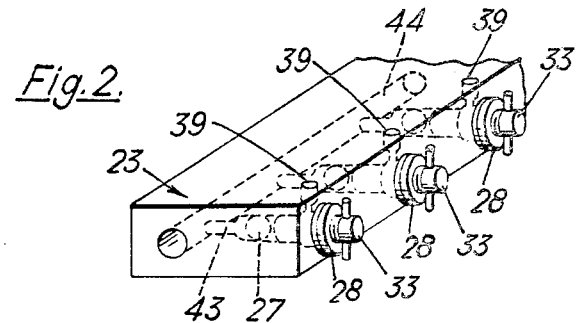
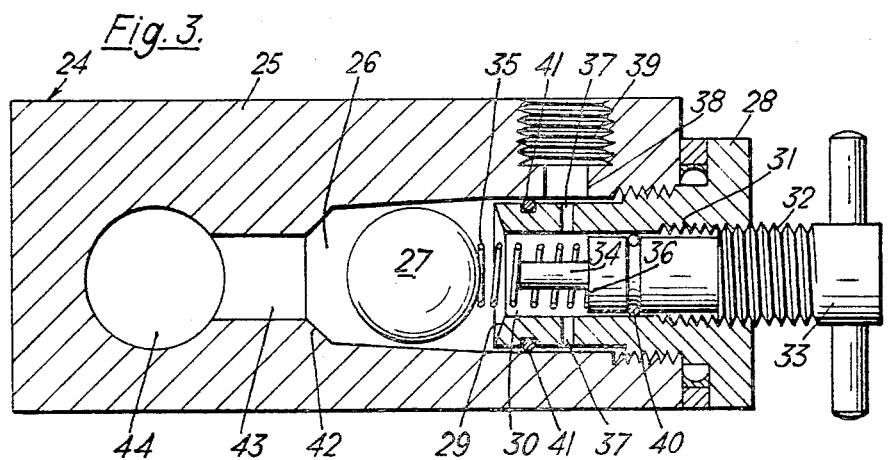
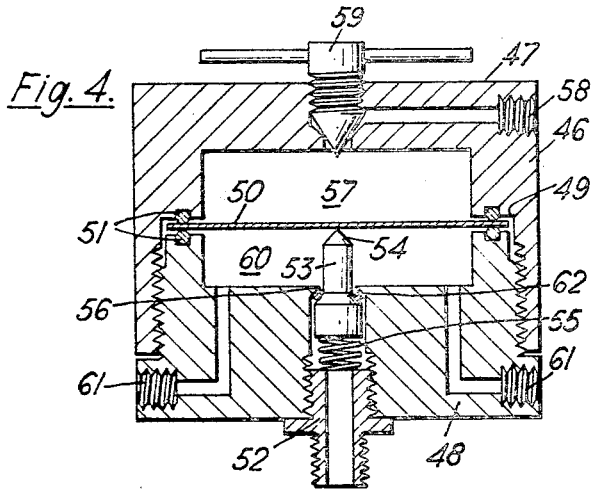
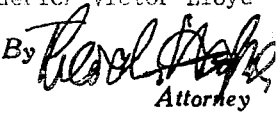

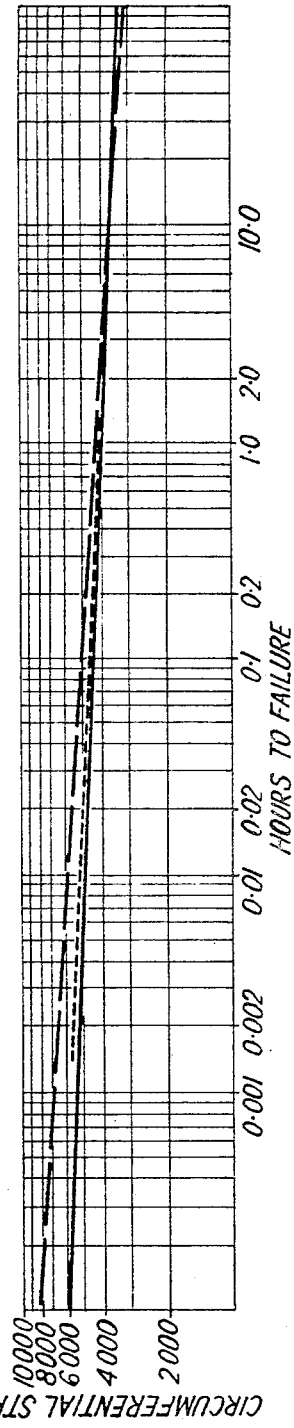
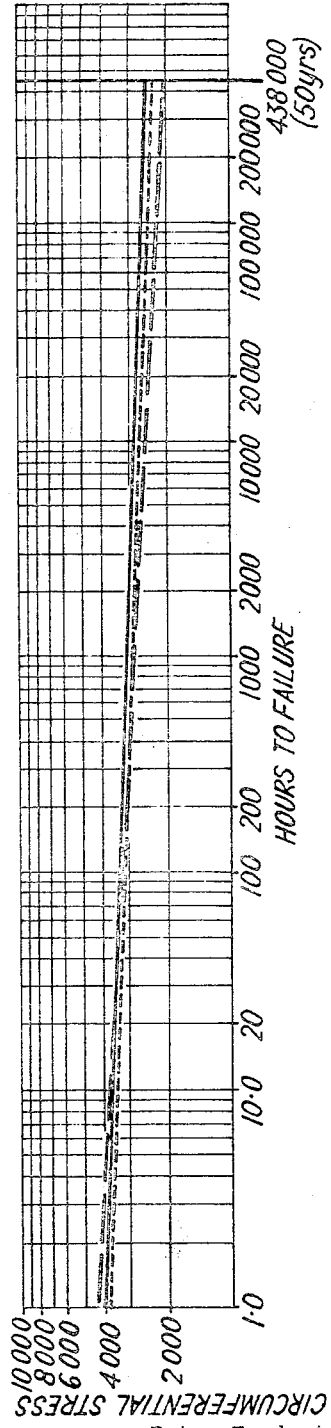
Fig. 5.

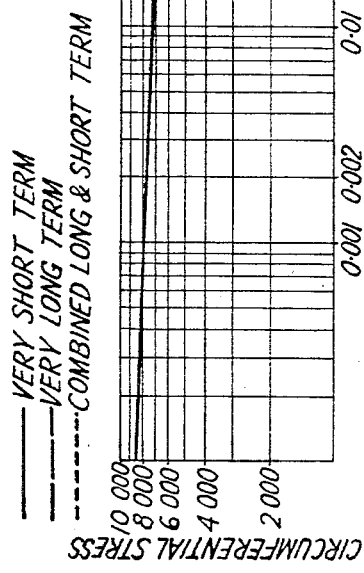
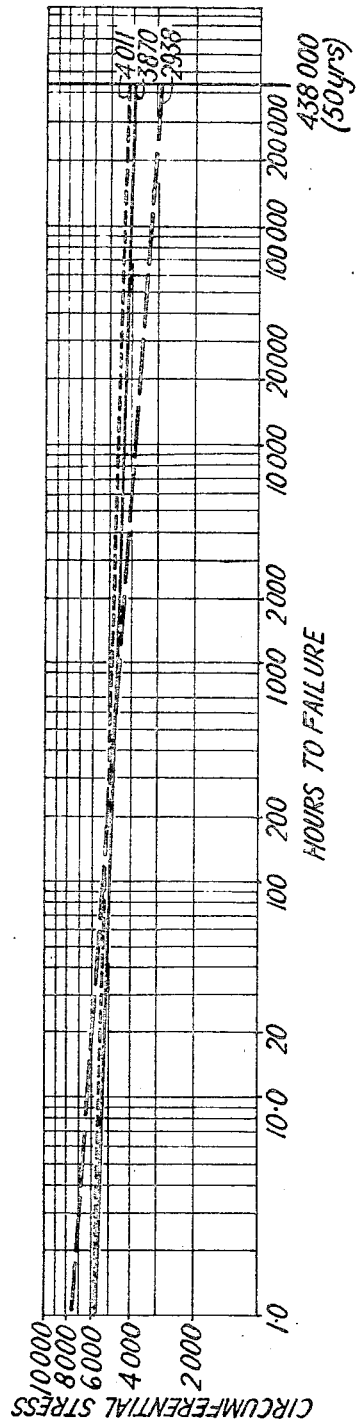
Fig. 6.

1

3,398,573
APPARATUS FOR TESTING TUBULAR OR HOLLOW ARTICLES, PARTICULARLY THERMOPLASTIC PIPES, DESIGNED TO WITHSTAND INTERNAL PRESSURE
Peter Frederick Victor Lloyd, London, England, assignor to Durapipe & Fittings Limited, London, England, a British company
Filed Aug. 26, 1966, Ser. No. 575,457
Claims priority, application Great Britain, Aug. 27, 1965, 36,973/65
5 Claims. (Cl. 73—49.5)

ABSTRACT OF THE DISCLOSURE

An apparatus for testing tubular or hollow articles includes a means to apply pressure to several test articles, means to individually indicate failure of the test articles, and automatic cutoff valves for each test article. Each cutoff valve also includes means to selectively shut off the supply of pressure to the particular test article.

---

This invention concerns improvement in or relating to apparatus for testing tubular or hollow articles, particularly thermoplastic pipes, designed to withstand internal pressure.

The use of stress rupture tests to determine the long-term safe working stress—and therefore the safe working pressure—or thermoplastic pipes is now standard practice in the development and quality control laboratories of plastics pipe manufacturers. In its existing form, however, stress rupture testing is a very lengthy process, and the results are subject to wide scatter.

One method that has been developed for carrying out these tests involves pressurizing a pipe specimen of known diameter and wall thickness so that the pipe is subjected to a known hoop stress. This stress is commonly derived from the formula $$s = P(D-t)/2t$$

where $s$ = hoop stress, $P$ = internal pressure, $D$ = mean outside diameter, $t$ = minimum wall thickness.

The pipe is held at the test pressure, and at a constant temperature, until it fails by bursting or by the appearance of fine pinholes which allow the internal pressure to fall. The time to failure is recorded.

If a number of such tests is carried out, the two variables, time-to-failure and stress, may be plotted on a two-way logarithmic graph. A regression line can then be calculated by the method of least squares. This line may be extrapolated, also by calculation, to determine the stress at any given time-to-failure, together with the lower confidence limit. In practice the regression line is usually extrapolated to a point corresponding to 50 years' life (approximately 438,000 hours). The corresponding stress, the "50 year failure stress," is then subjected to various arbitrary safety factors (depending on the application) to arrive at the maximum safe design stress, and therefore the maximum safe working pressure of the pipe.

One of the major drawbacks of the above described method is the length of time and number of specimens

2 necessary to determine the shape and slope of the regression line. This difficulty is accentuated by the high capital cost of the apparatus. It has been commonly held that tests of less than one hour duration are unreliable and show too much scatter, so the length of the regression line has usually been restricted from one to 438,000 hours, or 5½ decades on the logarithmic scale. To obtain adequate data from which to calculate the regression, it is therefore necessary to obtain plots covering at least the first three log decades (i.e., up to 1,000 hours or six weeks) and preferably covering four decades (up to 10,000 hours, well over a year). Data is available for some materials up to about 30,000 hours, or about 4½ log decades.

The usual procedure is to use tests of over 1,000 hours' duration only to determine the long-term properties of new materials or compounds. Quality control tests on production pipe—for obvious reasons—are usually restricted to about 1,000 hours' duration.

A further drawback is that the scatter of the data obtained from the tests makes accurate extrapolation difficult, and confidence limits generally tend to be rather wide. Moreover the greater the proportion of the length of the regression line confirmed by experimental data, the more accurately can the slope of the regression line and its extrapolation, be calculated. Since the length of time involved makes it impractical to obtain more data at the lower end of the regression line, it was decided to investigate the possibility of obtaining more data at the upper end, that is times-to-failure of less than one hour. Not only were such tests commonly held to be very inaccurate, but the results obtained by some workers were said to indicate that the regression line rose sharply upwards as the time scale approached zero, making extrapolation impossible.

Since the behaviour under investigation was consistently logarithmic, and the results were being plotted on logarithmic scales, it was suspected that the reasons for this anomaly were to be found in the equipment or methods of test being used, rather than some change in the behaviour of the material.

The system used for this type of testing involved filling the specimen under test with water, and connecting the specimen to a gas cylinder which was charged with air or nitrogen to the pressure required. The system has two main drawbacks, namely, (1) For very short-term tests, a predetermined test pressure cannot be accurately achieved in a time which is insignificant compared with the total test time. This is mainly because the gas volume must be large enough to compensate for the increase in volume as the specimen "creeps" under pressure. The large volume also takes some time to fill to the required pressure. If the timing of the test is started from the moment at which the test pressure is achieved, the significant amount of time during which the specimen has been subjected to a steadily increasing stress is not accounted for. The time-to-failure will then appear to be unduly short. Conversely, if timing is started from the moment at which pressure is first introduced, the test pressure is lower than that required for a significant proportion of the test time (i.e., while the specimen is being brought up to the test pressure), resulting in an unduly long time-to-failure and therefore an apparent sharp rise in the regression line. The latter fault would account for the results previously obtained, particularly as the effect becomes more pronounced as the stress is increased and the test time thereby reduced.

(2) For long-term tests, a constant internal pressure cannot be precisely maintained due to the large increase in volume (resulting in a drop in pressure) as the specimen "creeps" under pressure. The usual practice has been to top up the gas cylinder to the required pressure regularly resulting, in effect, in a slow speed cyclic variation of the test pressure. It has also been customary to incorporate an electrical contact pressure gauge and "hours-elapsed" counter into the system, so that, if the pressure drops below 1 or 2 percent of the required test pressure, the counter stops until the pressure is corrected. Towards the end of the test, the specimen may be increased in volume very rapidly, so that the test time as recorded by the counter is only a very small proportion of real time. The specimen is nevertheless under a considerable proportion—probably more than 90 percent—of the test pressure during this unrecorded time. The net result is an unduly short time-to-failure, the effect increasing with the duration of the test. This produced a gradual intensification of the downward slope of the regression line with decreasing stress and increasing test time. The effect is also increased if the test temperature is raised as the pipe material becomes more ductile so increasing the rate and amount of volumetric expansion. The more ductile the pipe material at normal temperatures, the more pronounced will be the effect of increasing test time and temperature. It is an object of the present invention to provide apparatus which overcomes or reduces the above-named drawbacks of known apparatus.

According to the present invention, there is provided apparatus for testing tubular or hollow articles designed to withstand internal pressure, such apparatus comprising means for introducing fluid under pressure into an article to be tested, means for indicating the pressure of the fluid within the article, means for indicating when the article fails, and a cutoff valve for automatically cutting off the pressurized supply to the article when the article fails, such cutoff valve comprising a valve member located within a chamber adapted to be placed in flow communication with the said pressurized supply and with the interior of the article being tested, such chamber including a seating against which the valve member as adapted to bear to cut off the supply of pressurized fluid to the article being tested, means being provided to load the said valve member to any desired amount to space it from the said seating but to permit the valve member to make sealing engagement with the seating when the flow rate of pressurized fluid to the article being tested exceeds a given value.

Usually the chamber will be adapted to be placed in flow communication at one end with the said pressurized supply and at the other end with the interior of the article being tested.

Desirably, means are provided for lifting the valve member away from the seating when it is desired to reset the cutoff valve.

Conveniently the said valve member is a ball or sphere.

Preferably spring means are provided to load the said valve member.

According to another feature of the invention, the said chamber may include a second seating located between the first named seating and the pressurized supply inlet to the chamber, means being provided to hold the said valve member against the second seating to shut off the pressurized supply when desired. The latter means may be provided by locking the aforesaid resetting means.

Conveniently the said apparatus is so constructed as to be suitable for testing a number of articles simultaneously in which case a manifold is provided including a passage into which the fluid under pressure may be introduced, a plurality of pipes being in flow communication with said passage and each being adapted to be in flow communication with a cutoff valve for automatically cutting off the pressurized supply to the article when the article fails.

It is desirable that the pressure of the fluid supplied to the article under test may be accurately controlled and, according to yet another feature of the invention, the apparatus may include a pressure regulator comprising two chambers separated by a flexible diaphragm, one said chamber being adapted to be charged with gas to a required pressure and sealed and the other or second chamber being an orifice for placing it in flow communication with an inlet for the pressure fluid, and said second chamber having at least one outlet, the said diaphragm serving to operate means for opening and closing the said orifice, and the arrangement being such that the fluid escaping from the outlet of the second chamber is at the same pressure as that of the gas in the first-named chamber.

Preferably the said opening and closing means comprise a spring-loaded piston axially slidable in said orifice.

Conveniently the said gas is an inert gas such as nitrogen, although it may, for example, be pressurized air.

The means for indicating when the article fails will normally be a timer.

In order that accurate results may be obtained, it is essential that the pressure rise time (i.e., the time for the pressure of the fluid in the article being tested to reach the test pressure) should be only a small proportion, preferably less than 1%, of the total test time, and the apparatus of the invention and particularly the aforesaid cutoff valve are so dimensioned that the required short pressure rise time is obtained.

In using the apparatus of the invention, the said fluid will preferably be a liquid.

The environment in the thermostatically controlled bath in which the specimens to be tested are normally supported and pressure fluid must be such as not to attack or modify the material of the articles under test. When a liquid is used this is conveniently water but may be aromatic fine oil, ethylene glycol or other liquid depending on the material of the articles being tested.

In order that the invention may be more readily understood, one embodiment thereof as applied to the stress rupture testing of thermoplastic pipe specimens will now be described by way of example, and with reference to the accompanying drawings in which:

FIGURE 1 is a schematic diagram of one embodiment of the apparatus of the invention, FIGURE 2 is a perspective view showing the arrangement of the cutoff valves of FIGURE 1, FIGURE 3 is a section through a cutoff valve of FIGURE 2, FIGURE 4 is a section through the pressure regulator of FIGURE 1, FIGURE 5 is a graph showing the result of tests carried out with the apparatus of FIGURES 1 to 4 for an ABS pipe; and FIGURE 6 is a graph showing the result of tests carried out with the apparatus of FIGURES 1 to 4 for PVC pipe.

As shown in FIGURE 1, the apparatus comprises a pressure supply source consisting of a flexible diaphragm-type hydropneumatic accumulator 1, conveniently of the type known as "Greer-Mercier," which is maintained between 2600 and 3000 p.s.i. by a high pressure water pump 2 (0–3600 lb./in.², 0.25 gal./min.) controlled by a pressure switch 3 with a pump motor control relay 4. The accumulator 1 has a gas precharge inlet 5. The output to a hydraulic main 6 is regulated to 2000 p.s.i. by an ordinary or coarse pressure regulator 7, a main supply line pressure gauge 8 being provided.

The specimens 9 being tested are suspended within a thermostatically controlled water bath 10, such bath being provided with heater coils 11, a stirrer 12 incorporating paddles 13, and circulation guides 14. Heater and stirrer interlocks and relays 15 are provided as well as a thermistor 16.

The hydraulic main 7 feeds any number of test stations, six in the embodiment being described, each station consisting of an assembly of a sensitive pressure regulator 17, an accurately calibrated test gauge 18, specimen connection points to the specimen end fittings 19, an air venting valve 20 and a timing unit 21 (having 1/60 second increments for very short-term tests and 0.1 hour for long-term tests) operated from a small electrical contact pressure gauge 22 (break on falling). These assemblies may be made as either single units but conveniently comprise a six-unit manifold generally indicated at 23 (approximately 8" by 2" by 3" in the embodiment being described) so that six specimens may be subjected to one pressure from one test gauge 18 and ordinary pressure regulator 7.

Also associated with each unit is a cutoff valve 24 for automatically cutting off the pressurized supply to the specimen under test when the latter ruptures or when the flow rate exceeds a given value.

This cutoff valve 24 (see FIGURE 3) comprises a main body member 25 axially bored to provide a central chamber 26 housing a valve member in the form of an accurately machined sphere or ball 27. Into one end of the bore is introduced and screw-threadedly engaged a centrally apertured boss 28 provided at its inner end with a shutdown valve seat 29 machined to fit the sphere 27. The outer part of the wall of the aperture 30 is screw-threaded at 31 and receives in screw-threaded engagement the body 32 of a valve operating spindle 33 the inner end portion of which is of reduced diameter to provide a resetting spindle 34 for the purpose hereinafter described.

A coil spring 35 is provided concentrically of the resetting spindle 34, its ends being located against the sphere 27 and the annular shoulder 36 provided between the main spindle 33 and the resetting spindle 34. One or more annular slots or ports 37 is or are provided in the peripheral wall of the boss 28, such slots or ports 37 communicating with an oulet 38 provided radially in the wall of the main body member and to which a supply line to the specimen 9 is secured at 39. Appropriate pressure seals 40 and 41 are provided between the boss 28 and the main spindle 33 and between the boss 28 and bore of the main body member 25.

The inner wall of the central chamber 26 in the main body member 25 converges slightly towards the inlet end thereof where it is provided with a stop valve seat 42 machined to fit the sphere 27. The end of the bore remote from the said boss is adapted to be placed in flow communication with the pressure supply source through inlet 43.

The central chamber 26 housing the sphere 27 is calibrated and vernier scale is provided on the main spindle 33.

As will be seen from, for example, FIGURE 3 the manifold 23 also includes a spine 44 through which pressure fluid is introduced into the inlets 43.

The automatic cutoff valve is operated by first screwing down the spindle 33 in order to seat the sphere 27 on the stop valve seat 42. The specimen 9 is then attached to the outlet 38 and the spindle 32 is unscrewed. As the sphere 27 comes off the stop valve seat 42 fluid passes via the bore 30 in the boss 28, the said slot or port 41 and the outlet 38 to the specimen 9. The unscrewing of the spindle 33 is continued and set to the required point on the vernier scale on the spindle.

When the specimen 9 expands rapidly or ruptures (depending on the vernier setting), the flow through the calibrated chamber 26 forces the sphere 27 against the shutdown valve seat 29 and cuts off the flow of pressurized fluid to the specimen.

The next specimen may then be attached, and the screw-operating spindle 33 screwed down to lift the sphere off the shutdown valve seat 29 so that pressurized fluid is supplied to the specimen and the method continued as before.

By using cutoff valves as above described, it is possible to maintain each specimen being tested at a precisely controlled pressure throughout the test despite volumetric expansion or even substantial leaks from end connections should these occur.

A drip valve 44 (FIG. 2) is provided to create minute flow through the sensitive pressure regulator 17 (FIG. 1) for very fine pressure control.

The sensitive pressure regulator 17 (see FIGURE 1), which is mounted within the water bath 10 for precise control of temperature, comprises a main body part 46 substantially cylindrical in shape with a closed end 47, a screw member 48 being located within and screw-threadedly engaged with the main body part 46 and serving to trap against an internal annular shoulder 49 of the main body part a stainless steel diaphragm 50 the peripheral edge portion of which is clamped between appropriate seals 51. The screw member 48 is axially bored, the outer part of the bore receiving in screw-threaded engagement an inlet tube 52 to which the pressurized supply source is adapted to be connected. A piston 53 slidable within the inner part 54 of the bore is supported on a coil spring 55, the lower end of which bears against the upper end of the inlet tube 52, the inner end of the piston 53 being pointed and being adapted to bear against the diaphragm 50. The inner part of the bore and the piston are so shaped that, when the piston is lowered, an annular orifice 56 is provided through which pressurized fluid enters, the piston being axially slidable in said orifice.

The diaphragm 50 separates two chambers, namely a first or reference pressure chamber 57 into which a gas, preferably nitrogen, may be introduced through an inlet 58, such inlet being closeable by a screw 59 provided in the end 47 of the main body part 46, and a second or controlled pressure chamber 60 which may be placed in communication through the said orifice with the pressurized fluid supply.

Any desired number of outlets 61 from the controlled pressure chamber 58 may be provided.

In operation, gas is introduced into the reference pressure chamber 57 so that it is at the pressure required for the fluid to be fed to the spine 44. The pressure fluid enters the controlled pressure chamber 60, the arrangement being such that, if the pressure within the reference pressure chamber 57 exceeds that in the controlled pressure chamber 60, the diaphragm 50 is downwardly displaced causing the piston 53 to move downwardly to open the orifice 56, water from the inlet 58 being permitted to pass through the orifice into the controlled pressure chamber 60. When the pressure within the controlled pressure chamber 60 exceeds that within the reference pressure chamber 57, the diaphragm 50 is upwardly displaced causing the piston 53 to rise, to make sealing engagement with washer 62 and to close the aforesaid orifice 56. In this way the water emanating from the or each outlet 61, and introduced into the specimen under test, is at the same pressure as the gas within the reference pressure chamber 57.

In using the above-described apparatus to stress rupture test a series of six thermoplastic pipes, the pressure control device is preset to the pressure necessary to give the required hoop stress. The specimens 9 are then fitted into the water bath 10 with the air venting valve open, the water level in the water bath (which has a valve controlled drain 63) being indicated at 64.

When the specimens 9 are fully conditioned, the venting valves are closed. The pressure in the specimens 9 rises almost instantaneously switching on the timing unit 21. The circuit to the timing unit is broken by the pressure drop when the specimen 9 associated therewith fails.

When one specimen 9 fails, the cutoff or shutdown valve 24 associated therewith serves to cut off the pressure supply so that there is no outward surge of pressure.

Since the stress in the pipe wall is calculated from the pipe dimensions as well as the internal pressure, the specimens are measured as accurately as possible before testing. Thus a grid lettered and numbered may be drawn on the specimens and the wall thickness measured at each intersection with a dial micrometer calibrated in 0.001 inch increments. The minimum measured wall thickness may be used to determine the test pressure and after each test the specimen is examined to ensure that failure has occurred on or near the grid intersection at which minimum wall thickness had occurred.

The results obtained may be plotted in exactly the same way as long-term stress rupture tests, but over the four log decades from 0.001 hr. to 10 hr. The regression line, extrapolation and lower confidence limits may also be calculated in the same way.

Tests have been caried out on two pipe materials for which long term stress rupture data over 1000 hours had already been obtained on conventional gas-charged equipment. FIGURES 5 and 6 show the results for an ABS pipe and a PVC pipe respectively. The top half of each graph shows the short-term data, and the bottom half the long-term data. Both regression lines (i.e. one from the short-term data, one from the long-term) are fully extrapolated over the whole range of test times for comparison. In each case, the continuous line is the regression line calculated from very short term data, the broken line is the regression line calculated from very long term data and the still more broken line is the regression line calculated from combined long and short term data.

It is interesting to note that the points on the short-term graph which lie further away from the regression line correspond to specimens in which failure occurred in between two intersections on the measuring grid, so that the minimum wall thickness was not known precisely.

From these graphs it can be seen that the regression line calculated from very short-term data passes through the plots obtained from long-term data. The extrapolation from short-term data alone gives a slightly higher 50 year failure stress but with narrower confidence limits, probably due to the elimination of the experimental errors described above.

The following table shows the 50-year failure stresses and lower confidence limits for a PVC and an ABS material calculated from (a) long-term data, (b) short-term data, (c) combined long- and short-term data:

compound to expensive full-scale long-term tests up to and over 1000 hours.

(3) Long-term tests up to 1000 hours can be quickly and easily supplemented by very short-term data to give a much more accurately extrapolated 50 year failure stress. A regression line from 0.001 to 438,000 hours can now be drawn, in which 6 out of 8½ log decades can be accurately confirmed by experimental data, as opposed to existing methods whereby only 3 out of 5½ log decades can be confirmed, and then with some difficulty.

Whilst the above described method of using the embodiment of the apparatus of the invention has been described as using water as the pressurized fluid, nevertheless it will be appreciated that any other suitable liquid (or gas) could be used as mentioned hereinbefore depending on the material of the specimen under test.

Whilst the invention has been particularly described in relation to the testing of thermoplastic pipes, it will be appreciated that the apparatus may also be used for testing other tubular or hollow articles, for example glass fibre pipes and thermoplastic bottles, designed to withstand initial pressure.

I claim:

1. An apparatus, for use in testing tubular or hollow articles designed to withstand internal pressure, comprising in combination, means adapted for introducing fluid under pressure into an article to be tested, means operable for indicating the pressure of the fluid within the article, means operative for indicating when the article fails, and a cutoff valve for automatically cutting off the pressurized supply to the article when the article fails, said cutoff valve defining a chamber and comprising a a valve member disposed within said chamber and adapted to be placed in flow communication with a source of pressurized fluid, and, respectively, with the interior of the article to be tested, a first seating formed within said chamber against which the valve member is operative to bear to cutoff the supply of pressurized fluid to the article being tested, means operable to load said valve member to any desired amount to space it from said first seating through permitting the valve member to make sealing engagement with the seating when the flow rate of pressurized fluid to the article being tested exceeds a given value, and a second seating formed in said chamber between said first seating and the inlet into the chamber for the pressurized fluid, and means operable for holding the valve member against said

| Material | Test data source | Test time (hours) | | Mean extrapolated failure stress at 50 years (p.s.i.) | Lower confidence limit at 50 years (p.s.i.) | Ratio of lower confidence limit to mean extrapolated value (LCL ratio) |
|---|---|---|---|---|---|---|
| | | Min. | Max. | | | |
| ABS | Very short-term tests on all-hydraulic apparatus. | 0.0035 | 11.55 | 2,569 | 2,123 | 0.825 |
| | Long-term tests (results obtained from both conventional and all-hydraulic apparatus). | 10.1 | 12,500 | 2,032 | 1,835 | 0.903 |
| | Combined short- and long-term data. | 0.0035 | 12,500 | 2,270 | 2,161 | 0.952 |
| PVC | Very short-term tests on all-hydraulic apparatus. | 0.0028 | 2.90 | 3,870 | 2,617 | 0.676 |
| | Conventional long-term tests on conventional apparatus. | 20.3 | 2,250.0 | 2,938 | 1,663 | 0.566 |
| | Combined short- and long-term data. | 0.0028 | 2,250.0 | 4,011 | 3,892 | 0.970 |

At present the following conclusions can be drawn:

(1) Very short-term data can be used for quality control purposes to establish whether or not the slope of the regression line corresponds to a "master regression line" previously established on the adoption of the pipe material or compound.

(2) Very short-term data (up to as little as 5–8 hours) can be used as a quick screening test to establish whether it is worthwhile submitting a new material or second seating to shut off the pressurized supply when desired.

2. The apparatus of claim 1, in which means are provided for lifting said valve member from the first seating when it is desired to reset the cutoff valve.

3. The apparatus of claim 1, including a manifold, a passage within said manifold, a plurality of pipes in flow communication with said passage, and a plurality of cutoff valves adapted to be placed in flow communication one with each of said pipes.

4. Apparatus, as claimed in claim 1, and a pressure regulator comprising a flexible diaphragm separating two chambers, one said chamber being adapted to be charged with gas to a required pressure and sealed, an inlet for pressure fluid, said second chamber having an orifice for placing said second chamber in flow communication with said inlet, an outlet from said second chamber, and means operated by said diaphragm for opening and closing the orifice, the arrangement being such that the fluid escaping from the outlet of the second chamber is at the same pressure as that of the gas in the first named chamber.

5. The apparatus of claim 4, in which said means for opening and closing said orifice comprise a spring-loaded piston axially slidable in said orifice.

References Cited

UNITED STATES PATENTS

| | | | |
|---|---|---|---|
| 2,428,150 | 9/1947 | Field | 73—40.5 XR |
| 2,534,158 | 12/1950 | Annin | 73—40 |
| 2,597,231 | 5/1952 | Edelen | 73—49.7 |
| 2,777,456 | 1/1957 | Ey | 137—505.42 XR |
| 2,895,328 | 7/1959 | Payne et al. | |
| 3,159,388 | 12/1964 | Wall | 137—505.42 XR |
| 3,234,961 | 2/1966 | Arnes | 137—517 |

FOREIGN PATENTS 692,833 8/1964 Canada.

DAVID SCHONBER, *Primary Examiner.*

JEFFREY NOLTON, *Assistant Examiner.*